(12) United States Patent
Kenyon et al.

(10) Patent No.: US 6,651,425 B2
(45) Date of Patent: Nov. 25, 2003

(54) STAMPED EXHAUSTS MANIFOLD FOR VEHICLE ENGINES

(75) Inventors: Paul Kenyon, Taylor, MI (US); Vince Stempien, West Bloomfield, MI (US); Tom Ketelhut, Southgate, MI (US)

(73) Assignee: Metaldyne Tubular Products, Inc., Canton, MI (US)

( * ) Notice: Subject to any disclaimer, the term of this patent is extended or adjusted under 35 U.S.C. 154(b) by 16 days.

(21) Appl. No.: 10/147,791

(22) Filed: May 17, 2002

(65) Prior Publication Data

US 2002/0195083 A1 Dec. 26, 2002

Related U.S. Application Data

(63) Continuation of application No. 09/535,320, filed on Mar. 27, 2000, now abandoned.
(60) Provisional application No. 60/127,313, filed on Apr. 1, 1999.

(51) Int. Cl.[7] ................................................. F01N 7/10
(52) U.S. Cl. ............................. 60/323; 60/322; 60/272
(58) Field of Search .......................... 60/322, 323, 272, 60/282, 320, 324

(56) References Cited

U.S. PATENT DOCUMENTS

| 4,386,586 A | 6/1983 | Santiago et al. |
|---|---|---|
| 4,671,057 A | 6/1987 | Kronich |
| 4,689,952 A | 9/1987 | Arthur et al. |
| 5,018,661 A | 5/1991 | Cyb |
| 5,572,867 A | 11/1996 | Bekkering et al. |
| 5,572,868 A | 11/1996 | Okamoto et al. |
| 5,682,741 A | 11/1997 | Agustin et al. |
| 6,247,552 B1 | 6/2001 | Kovar et al. |

FOREIGN PATENT DOCUMENTS

| CA | 1272089 | 7/1990 |
|---|---|---|
| CA | 1309356 | 10/1992 |
| DE | 32 16980 | 11/1983 |
| EP | 0 582 985 | 7/1994 |
| GB | 80 04 882 | 6/1980 |
| JP | 5171932 | 7/1993 |
| JP | 7224650 | 8/1995 |
| JP | 8028262 | 1/1996 |
| JP | 09280045 | 10/1997 |

OTHER PUBLICATIONS

Enclosed are six (6) photos of a prior art manifold manufactured by Benteler.

*Primary Examiner*—Thomas Denion
*Assistant Examiner*—Binh Tran
(74) *Attorney, Agent, or Firm*—Robert H. Earp, III; McDonald Hopkins, Co., LPA

(57) ABSTRACT

An exhaust manifold for a vehicle engine constructed of two stamped halves joined together along a longitudinal weld seam to form a compactly configured manifold. The assembled manifold includes exhaust tubes in communication with the combustion chambers of the engine and a collector chamber for directing exhaust from the tubes to the exhaust system. The individual exhaust tubes are configured for a compact installation and the collection chamber facilitates efficient flow of exhaust through the manifold.

12 Claims, 10 Drawing Sheets

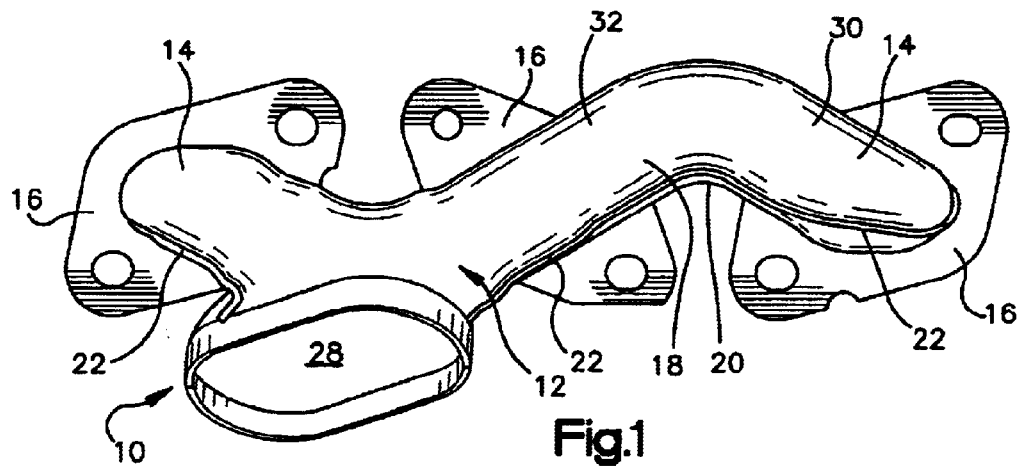
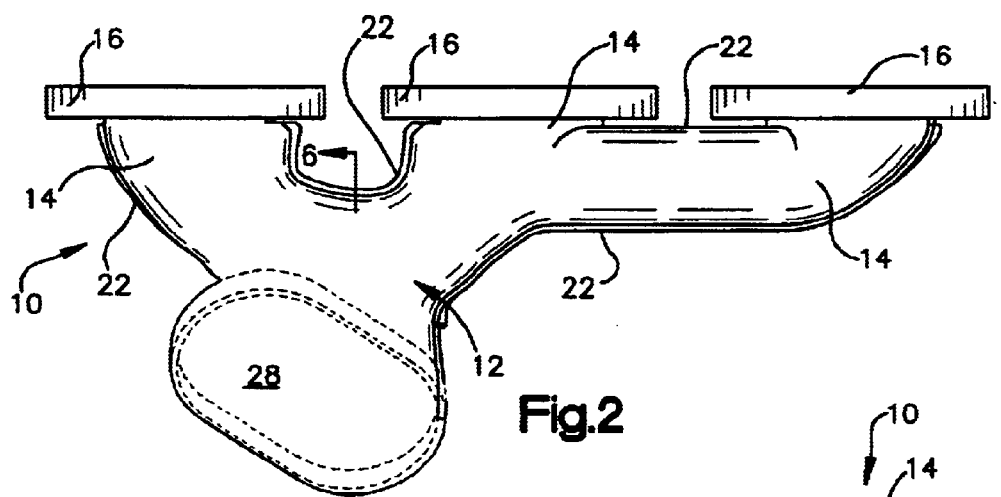
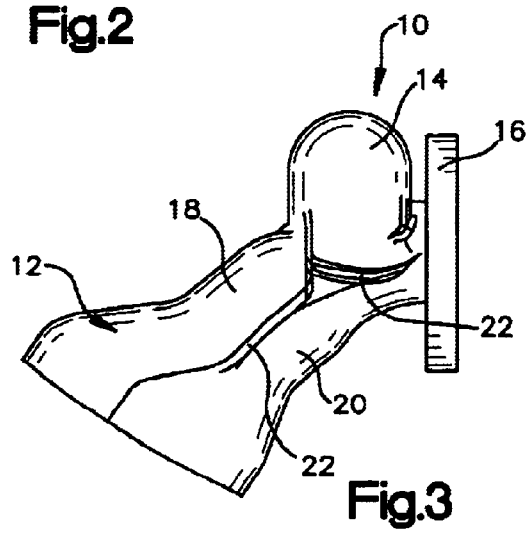

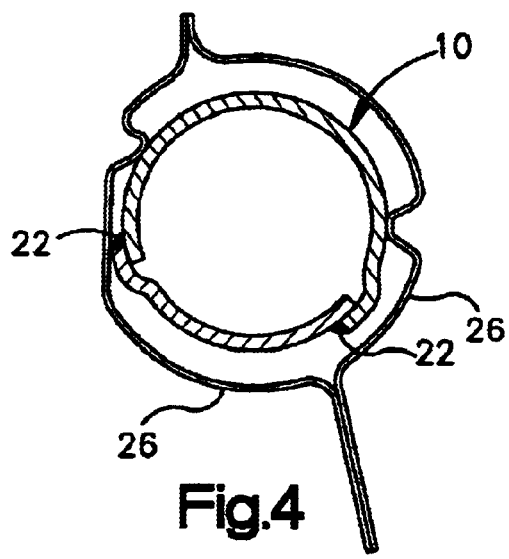
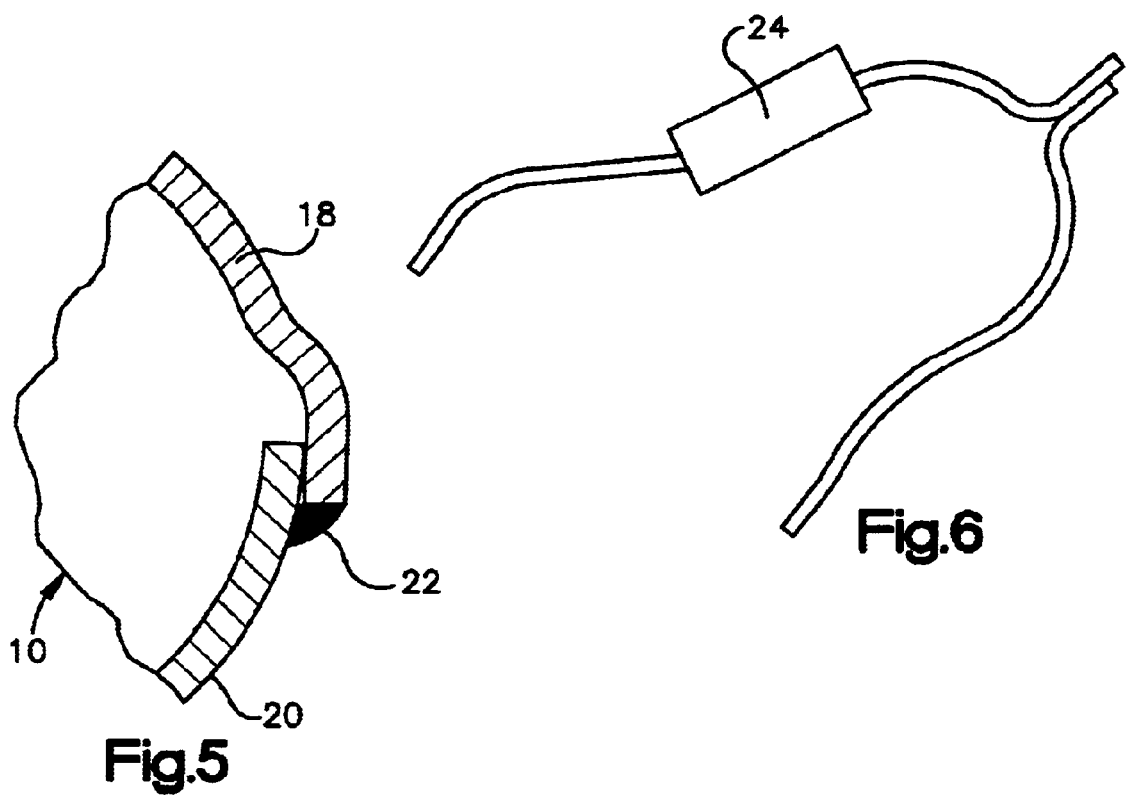

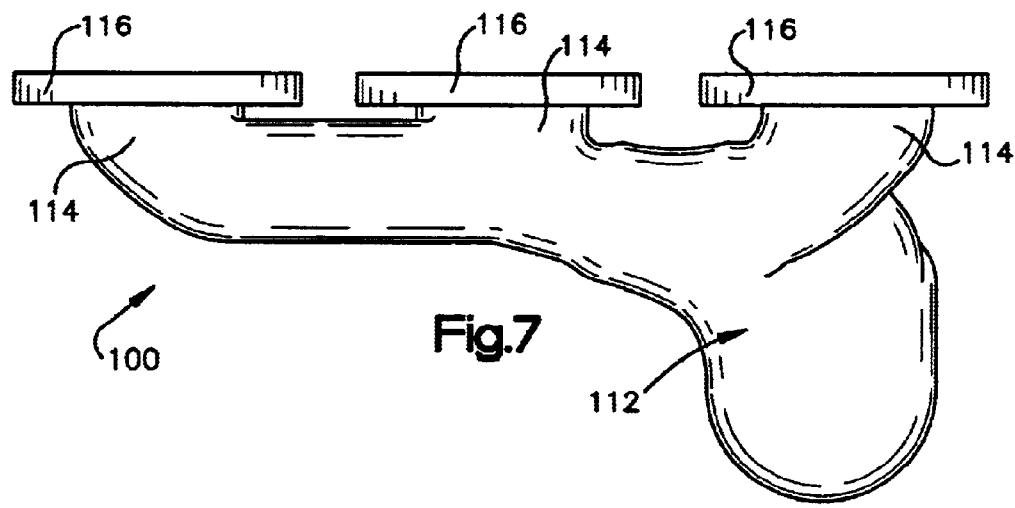
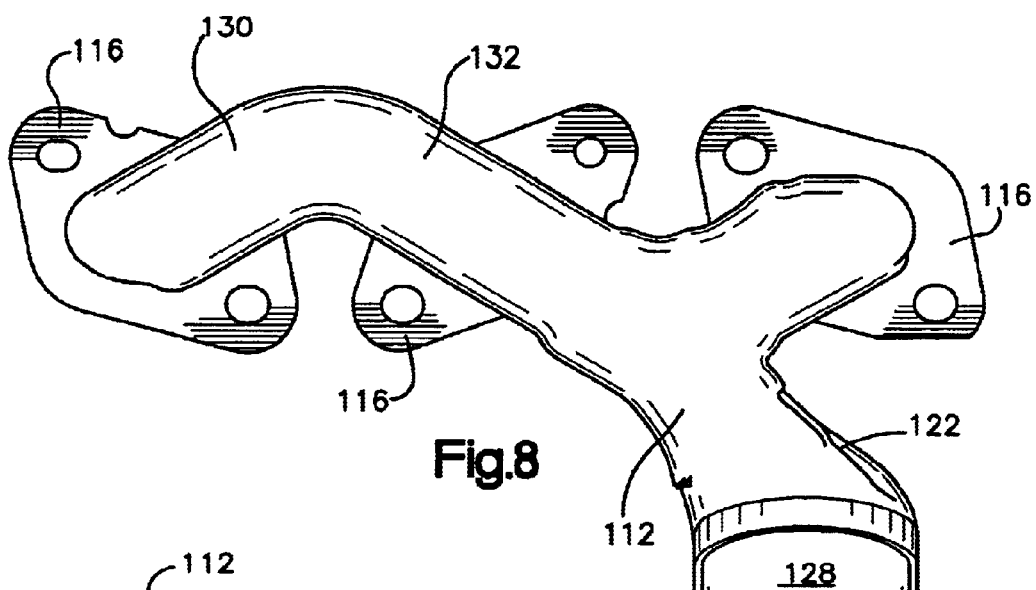
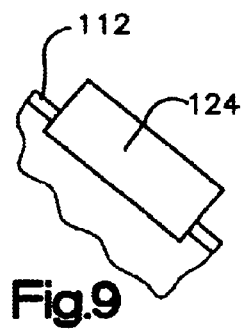

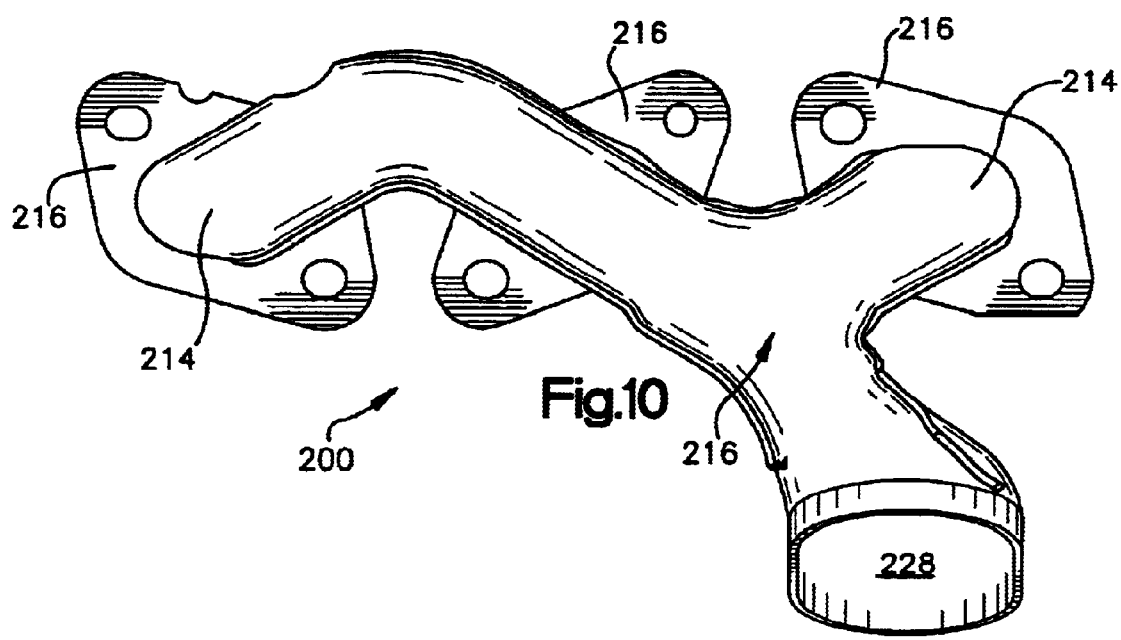
Fig.10
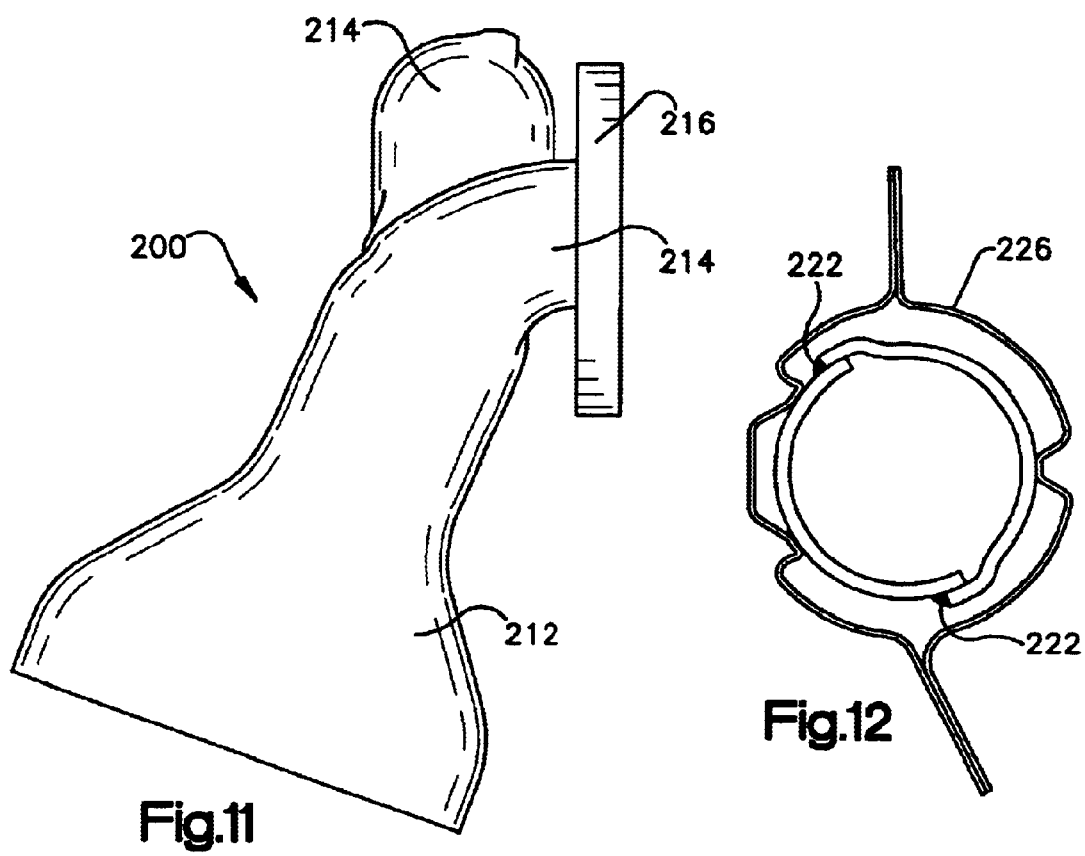
Fig.11
Fig.12

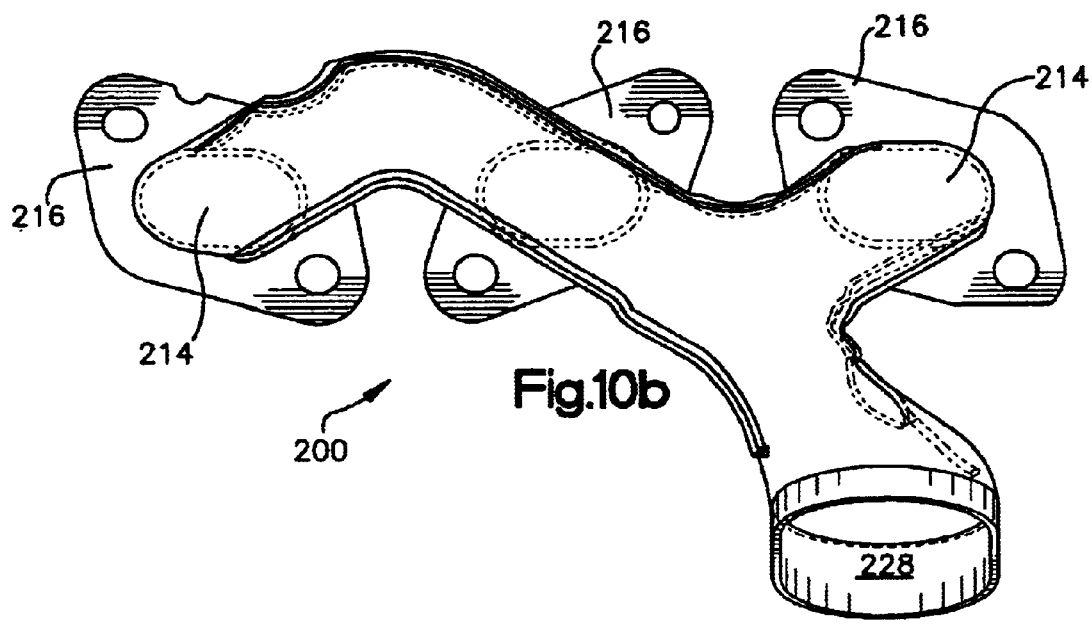
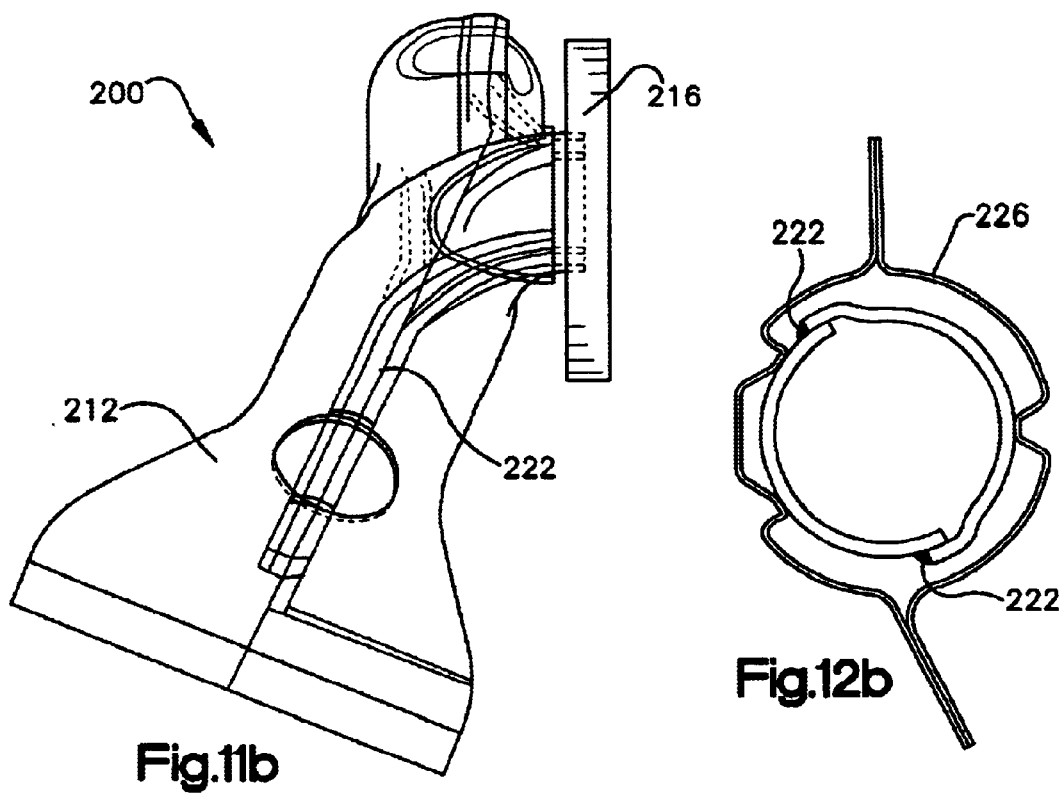

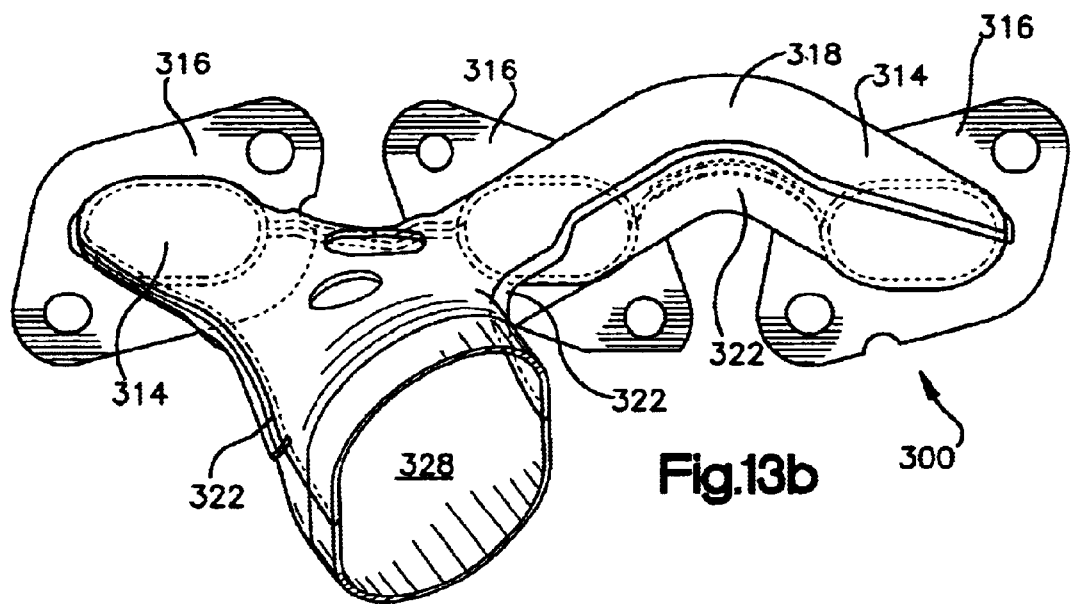
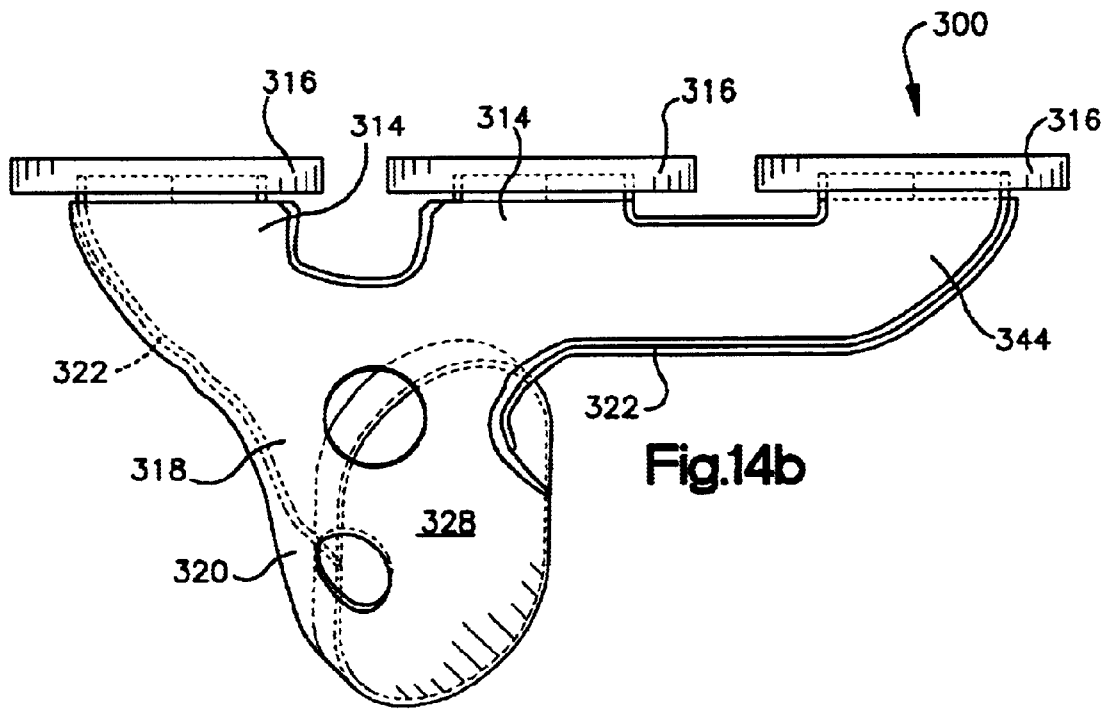

STAMPED EXHAUSTS MANIFOLD FOR VEHICLE ENGINES

This application claims the priority of U.S. Provisional Patent Application No. 60/127,313 filed on Apr. 1, 1999 and is a continuation of U.S. patent application Ser. No. 09/535,320 filed on Mar. 27, 2000, now abandoned.

BACKGROUND OF THE INVENTION

I. Field of the Invention

This invention relates to exhaust manifolds for vehicle engines and, in particular, to an exhaust manifold assembled from two stamped halves which optimizes the flow of exhaust gases and is capable of fitting within the confined spatial limitations of modem engine assemblies.

II. Description of the Prior Art

Exhaust manifolds are utilized to direct exhaust gases from the outlet ports of the engine combustion chamber to the exhaust system for discharge into the atmosphere. The manifolds typically collect the exhaust gases from a plurality of chambers and direct the gases through a single passageway. In order to facilitate efficient operation of the engine and exhaust of the gases, the configuration of the manifold must facilitate collection and direction of the gases to the exhaust system. In early vehicles, little consideration was given to the configuration of the manifold since the engine compartment had sufficient space to incorporate the manifold. However, as the engine compartments have been reduced in size and the increased complexity of modern engines has reduced available space, vehicle designers have increasingly dictated complex and compact manifold configurations. Yet the manifold must be capable of efficiently exhausting gases from the engine.

Metal stampings were originally used to manufacture manifolds and included weld seams. However, the limitations of metal stampings limited the configurations of the manifold since manifold tubes with tight radiuses could not be manufactured. A small radius exerts stresses on the stamping which can result in failure of the manifold under the extreme operating temperatures. Nevertheless, truly compact and efficient manifolds have not been successfully manufactured in the past.

Alternative techniques for manufacturing compact exhaust manifolds have been utilized with limited success. In order to minimize weld seams which can result in stress fractures, some manifold configurations have been expanded to the desired configuration. One increasingly popular method is the hydroforming of tubular blanks. Internal fluid pressure is utilized to expand the walls of the tube to a desired cross-sectional configuration while also supporting the tube walls during bending into complex configurations. However, it has been found that the hydroformed tubes must be assembled to form the complete manifold in such a manner as to require welds in high temperature and stress areas of the manifold. The variations in temperature as the manifold is in use and then cools causes failure of these weld seams.

SUMMARY OF THE PRESENT INVENTION

The present invention overcomes the disadvantages of the prior known manifolds by providing an exhaust manifold which efficiently exhausts gases from the engine and is capable of being positioned within a compact engine compartment.

The exhaust manifold of the present invention is assembled from two manifold halves stamped to include the collector chamber and the individual manifold tubes. The halves of the manifold are joined by a longitudinal weld seam which extends from the collector chamber the length of each of the tubes. A manifold flange is secured to the ends of the tubes to facilitate attachment to the engine.

The individual tubes of the manifold have a first, substantially uniform diameter over the length of the tube which expands to the diameter of the collection chamber. A plurality of exhaust tubes provide fluid communication between exhaust ports of the engine to the collection chamber. In a preferred embodiment, three exhaust tubes are incorporated into each manifold. Typically, a manifold is provided for each side of the engine. The exhaust tubes include a first tube proximate the collection chamber and directly in communication with the chamber. A second intermediate tube is in communication with a third outer tube which both direct exhaust to the collection chamber. The outer tube is most remote from the collection chamber. The individual tubes are configured to extend through specific space requirements. Additional components of the manifold may include sensors seated in the collection chamber and heat shields to protect components proximate to the manifold from extreme temperatures.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 4 is a transverse cross-sectional view of a manifold tube with a surrounding heat shield;

FIG. 5 is a partial cross-sectional view of the weld seam of the manifold;

FIG. 6 is a partial cross-sectional view of the collection chamber of the manifold taken along lines 6—6 of FIG. 2;

FIG. 10 is a front elevational view of a third embodiment of the exhaust manifold;

FIG. 11 is an end view of the manifold;

FIG. 12 is a transverse cross-sectional view of an exhaust tube of the manifold;

DETAILED DESCRIPTION OF A PREFERRED EMBODIMENT OF THE PRESENT INVENTION

Figure 1B:
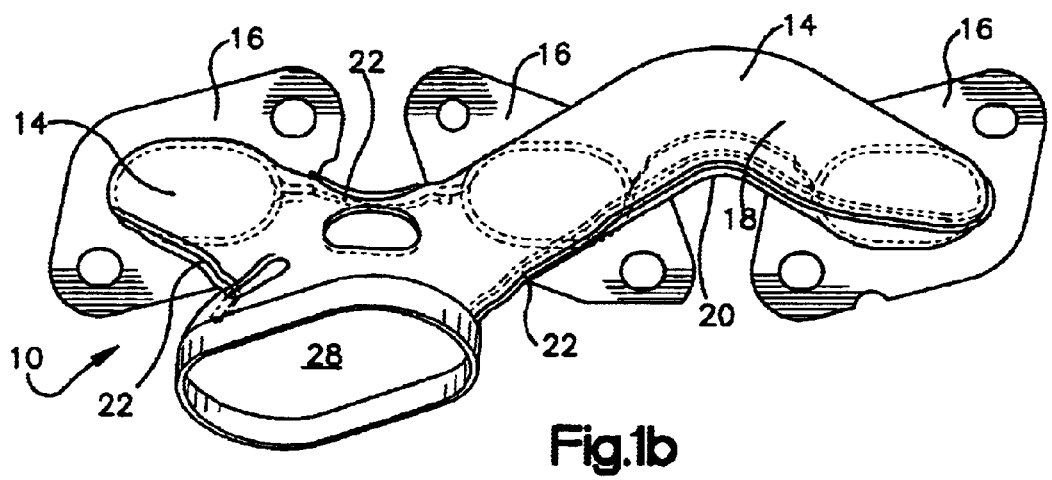
FIG. 1 is a front elevational view of a first embodiment of an exhaust manifold embodying the present inventions.
Figure 2B:
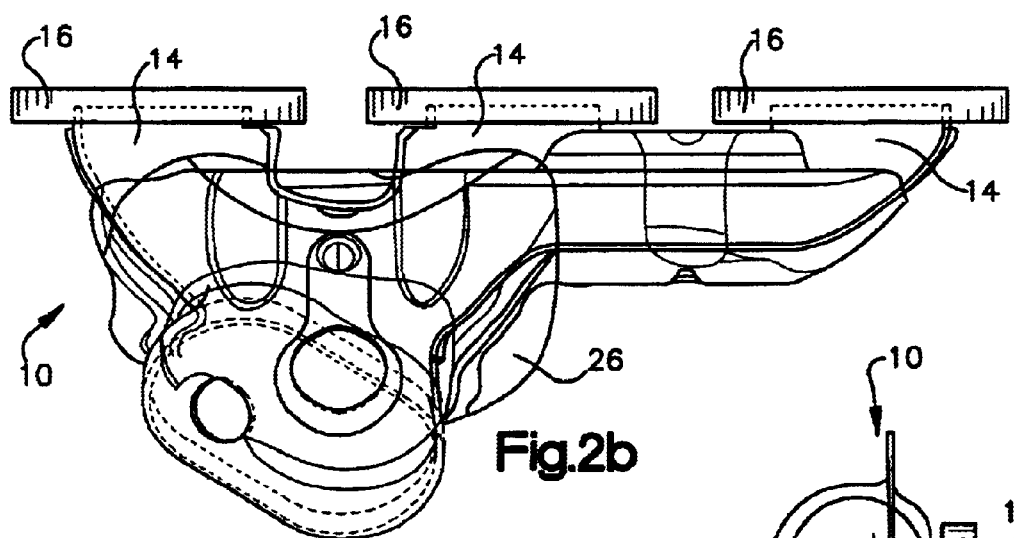
FIG. 2 is a bottom plan view of the manifold.

The drawings disclose several embodiments of an exhaust manifold used to direct exhaust gases from a plurality of exhaust ports of an engine to the environmental control and exhaust system. The manifold will be secured directly to the engine in communication with the exhaust port. As a result, the manifold is subject to extreme temperatures from the exhaust during operation of the engine and subsequent cooling. The manifold assembly must be capable of withstanding such operating environments without failure or leakage. Additionally, the manifolds of the present invention are configured to compactly fit within an engine compartment yet efficiently direct exhaust gases through the exhaust system.

A first embodiment of the exhaust manifold 10 is designed for connection to one side of a vehicle engine (now shown). The manifold 10 has a body 12 comprising a plurality of tubular arms 14 corresponding to the number of exhaust ports. Each of the tubular arms 14 terminates with a mounting flange used to sealingly secure the manifold 10 to the engine in communication with the exhaust port. The body 12 including the arms 14 is manufactured of two stamped halves 18 and 20. The stamped metal halves 18 and 20 are attached along a longitudinal weld seam 22. Preferably, the seam 22 has an overlap as best shown in FIG. 5 to improve the sealing capability of the seam 22. Additional components such as sensors 24 and heat shields 26 may be incorporated as required for a specific application.

Figure 3B:
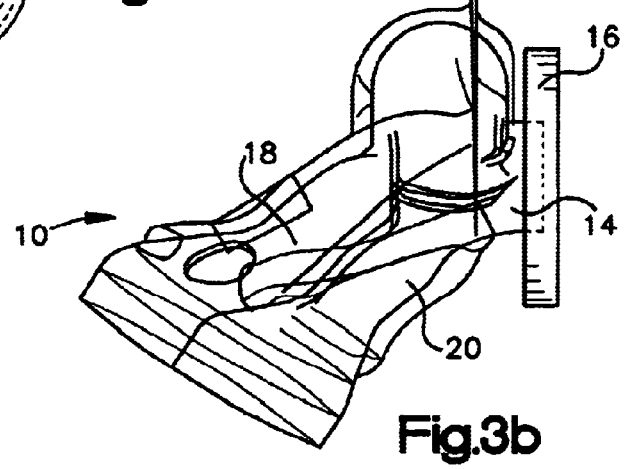
FIG. 3 is a right end view of the manifold.

The manifold 10 formed by the two stamped halves 18 and 20 includes a first tube 14 proximate a collector chamber 28, a second tube 14 remote from the chamber 28 and an intermediate tube 14. All of the tubular arms 14 direct exhaust to the collector chamber 28 which has a larger diameter to accommodate the increased gas volume from all three tubes 14. The remote or outermost tube 14 extends substantially parallel to the plane formed by the mounting flanges 16 and includes an upward segment 30 and a downward segment 32 to pass by the intermediate tube 14 such that gases from these two tubes 14 combine into the collector chamber 28. The first tube 14 also directs gases to the chamber. The collector chamber 28 is oriented substantially downwardly (FIG. 3) to communicate with the exhaust system.

The first embodiment of the manifold 10 has a collection chamber 28 which is directly in communication with one of the tubes 14. The other two exhaust tubes corresponding to the additional exhaust ports converge together prior to communicating with the collector chamber 28. The outlet of the collector chamber 28 is disposed at a substantially downward orientation.

Alternative embodiments of the stamped manifold are shown in the remaining FIGS. 7 through 15. Each of these manifold configurations is formed of two stamped halves joined along a longitudinal weld seam. The stampings incorporate tight curves and specific diameters in order to optimize the flow of exhaust while also facilitating compact installation within the engine compartment.

Figure 7B:
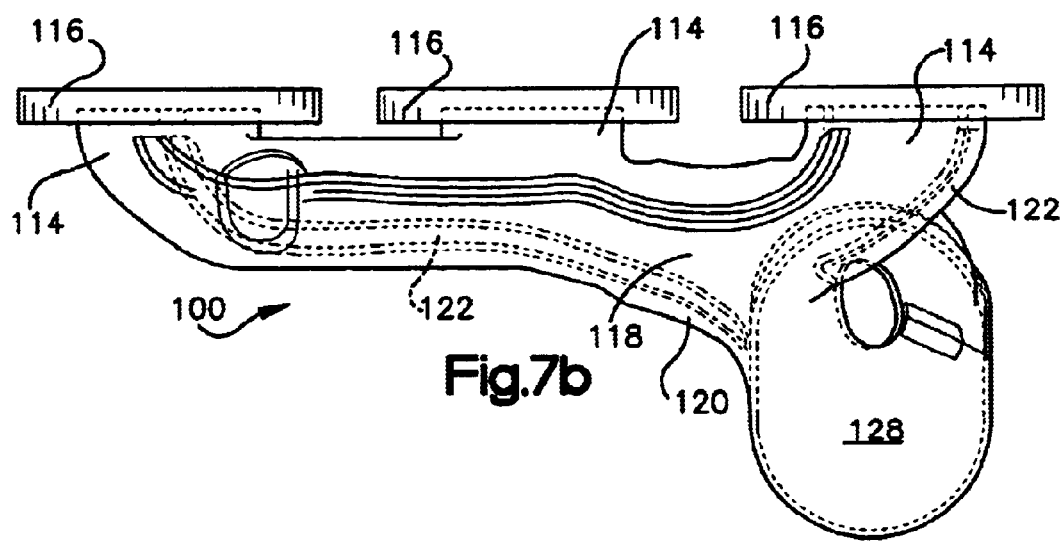
FIG. 7 is a top plan view of a second embodiment of the exhaust manifold.
Figure 8B:
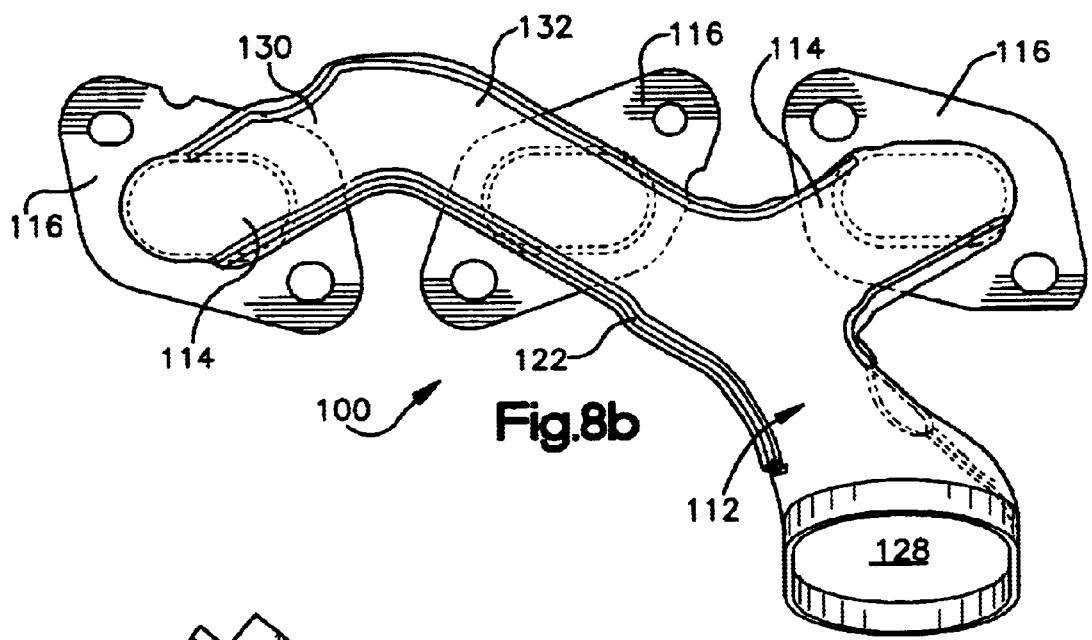
FIG. 8 is a front elevational view of the manifold.
Figure 9B:
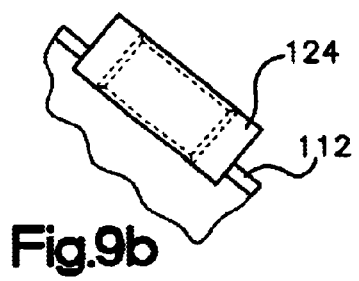
FIG. 9 is a partial view of a sensor port for the manifold.

The second embodiment of FIGS. 7 through 9 of the manifold 100 has a different overall configuration to accommodate the exhaust requirements of a different engine setup. The exhaust tubes 114 are all in communication prior to directing flow to the exhaust chamber 128 and the remainder of the exhaust system. The manifold 100 is constructed from two stamped halves joined at the welded seam 122. The stampings facilitate manufacture of the strict configurations required by modern engine assemblies.

The third embodiment of the manifold 200 shown in FIGS. 10 through 12 is the pairwise exhaust manifold of the second embodiment 100 for the opposite side of the engine to collect exhaust and direct the gasses to the exhaust system. The manifold 200 similarly includes a pair of stamped halves 218, 220 joined along a seam 222. The manifold 220 has exhaust tubes 214 to direct flow to the chamber 228.

Figure 13:
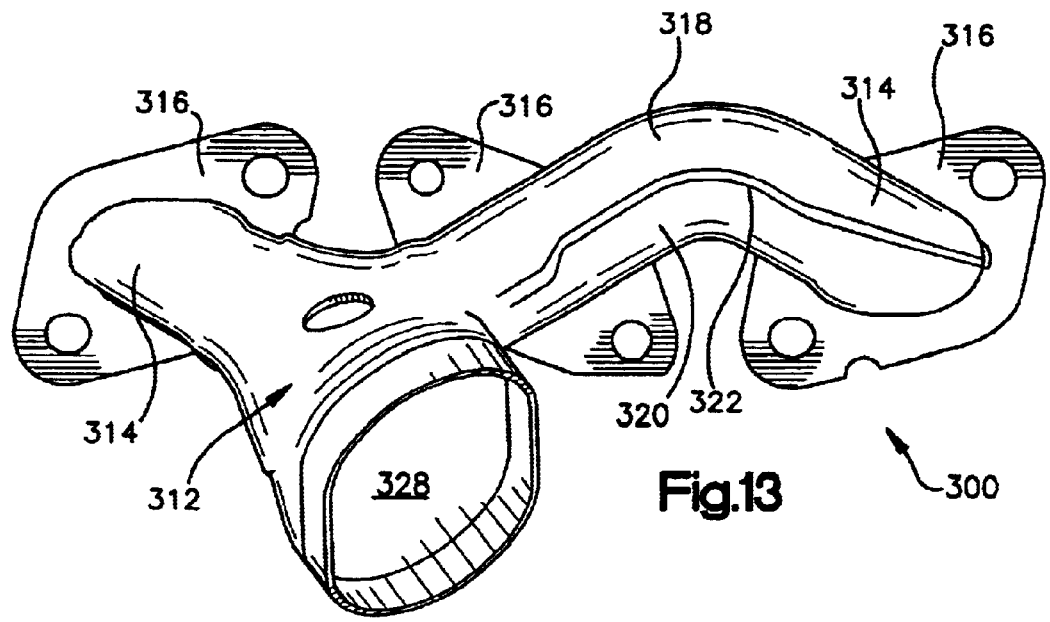
FIG. 13 is a front elevational view of a fourth embodiment of the exhaust manifold.
Figure 14:
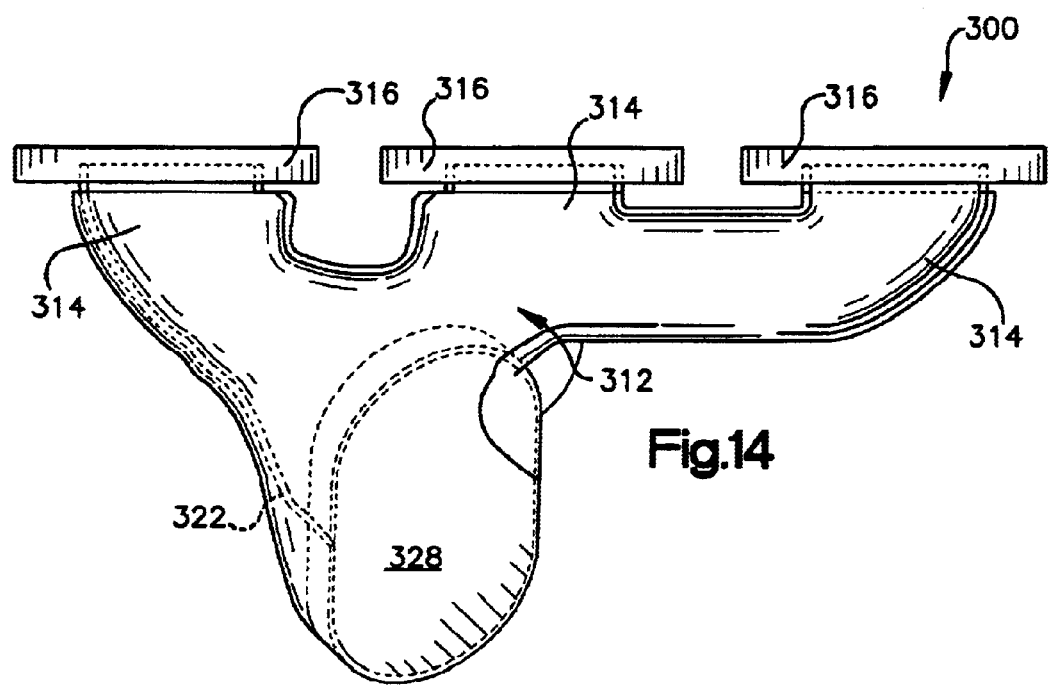
FIG. 14 is a top plan view of the manifold.
Figure 15:
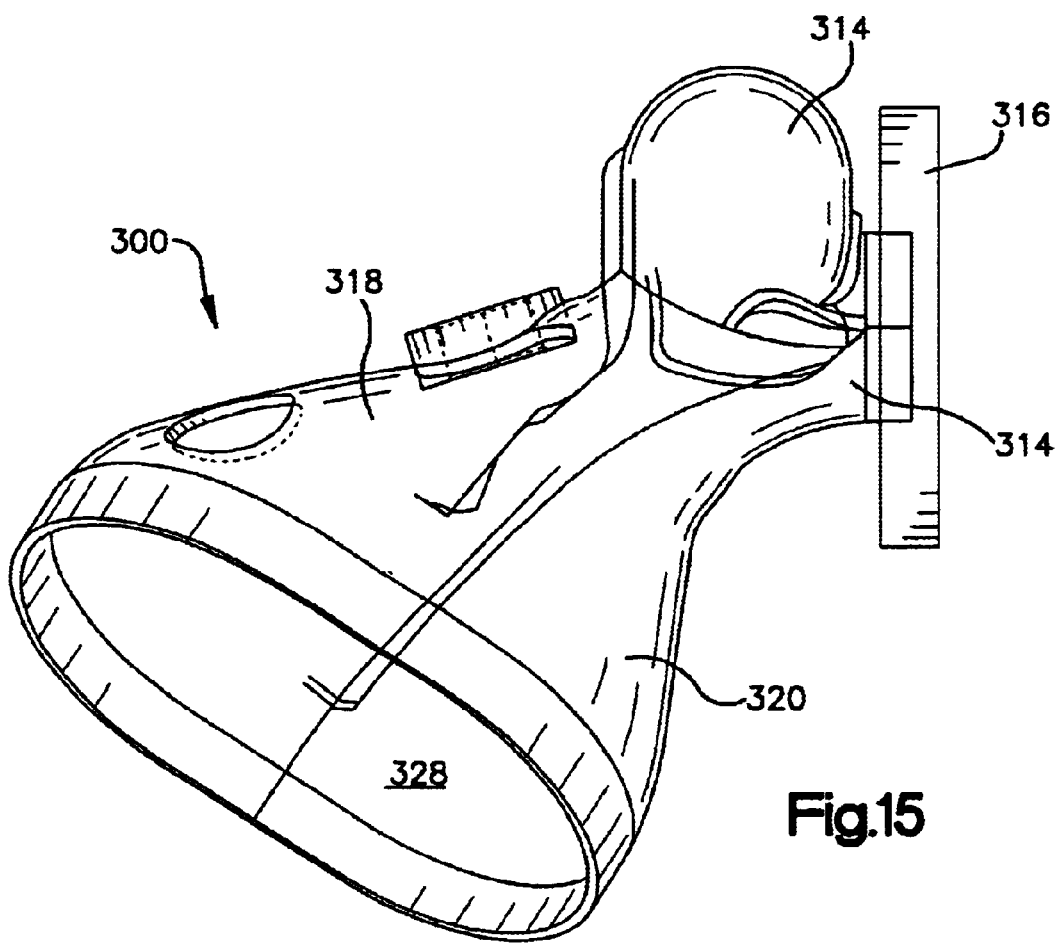
FIG. 15 is an end view of the manifold.

The fourth embodiment shown in FIGS. 13 through 15 is similarly the opposing pair of the manifold 10. The manifold 300 includes stamped halves 318, 320. The weld seam 322 extends along the manifold body to join the halves. The manifold 300 has exhaust tubes 314 to direct exhaust flow to a collector chamber 328.

The forgoing detailed description has been given for clearness of understanding only and no unnecessary limitations should be understood therefrom as some modifications will be obvious to those skilled in the art without departing from the claimed invention.

What is claimed is:

1. An exhaust manifold adapted to collect exhaust gases from the exhaust ports of a combustion engine and direct the gases to an exhaust system, said improved exhaust manifold comprising:

a first manifold portion stamped into a first configuration having a plurality of inlet arms with openings, a collection chamber with an outlet opening and a longitudinal edge extending along both sides of said inlet arms and said collection chamber between each of said inlet openings and said outlet opening;

a second manifold portion stamped into a second configuration having a plurality of inlet arms with openings, a collection chamber with an outlet opening and a longitudinal edge extending along both sides of said inlet arms and said collection chamber between each of said inlet openings and said outlet opening for mating attachment to said first manifold portion to form a fluid passageway wherein said longitudinal edges of said first and second manifold portions have substantially identical configurations for joining said first manifold portion and said second manifold portion, said joined edges forming a seam extending between each of said inlet openings and said outlet opening; and at least one mounting flange secured to said joined manifold portions for mounting said manifold in communication with the engine exhaust ports.

2. The exhaust manifold as defined in claim 1 wherein said first and second manifold portions are stamped to include a plurality of arms and a body section.

3. The exhaust manifold as defined in claim 2 wherein said joined longitudinal edges of said first and second manifold portions form an overlapping seam, said seam welded to seal said fluid passageway and fixedly join said first and second manifold portions.

4. The exhaust manifold as defined in claim 1 wherein said at least one mounting flange is secured to an end of said manifold arms for mounting said manifold to the engine.

5. An exhaust manifold adapted to collect exhaust gases from the exhaust ports of a combustion engine and direct the gases to an exhaust system, said improved exhaust manifold comprising:

a first manifold portion stamped into a first configuration including a plurality of arms having inlet openings and a body section having an outlet opening, said first stamped manifold portion having longitudinal edges extending along both sides of said inlet arms and said body section between each of said inlet openings and said outlet opening;

a second manifold portion stamped into a second configuration including a plurality of arms having inlet openings and a body section having an outlet opening, said second stamped manifold portion having longitudinal edges extending along both sides of said inlet arms and said body section between each of said inlet openings and said outlet openings for substantially conforming to said edges of said first manifold portion;

wherein said first and second manifold portions are joined along said edges to form a fluid passageway having a plurality of exhaust tubes for communication with the engine exhaust ports and a collection chamber for directing exhaust to the exhaust system, said joined edges of said first and second manifold portions forming a seam extending along opposite sides of each of said exhaust tubes and said collection chamber; and a novelty flange secured to each of said exhaust tubes for mounting said manifold in communication with the engine exhaust ports.

6. The exhaust manifold as defined in claim 5 wherein said joined edges of said first and second manifold portions form an overlapping seam.

7. The exhaust manifold as defined in claim 6 wherein said overlapping seam is welded to fixedly join said first and second manifold portions and seal said fluid passageway.

8. The exhaust manifold as defined in claim 7 and further comprising a heat shield attached to said manifold, said heat shield substantially enveloping said exhaust manifold.

9. An exhaust manifold adapted to collect exhaust gases from the exhaust ports of a combustion engine and direct the gases to an exhaust system, said exhaust manifold comprising:

a first manifold portion having a first configuration having a plurality of inlet arms with an opening, a collection chamber with an outlet opening and a longitudinal edge extending along the exterior portion of the outermost inlet arms and said collection chamber between the opening of said outmost inlet arms and said outlet opening;

a second manifold portion stamped into a second configuration having a plurality of inlet arms with an opening, a collection chamber with an outlet opening and a longitudinal edge extending along the exterior portion of the outermost inlet arms and said collection chamber between the opening of said outmost inlet arms and said outlet opening for mating attachment to said first manifold portion to form a fluid passageway wherein said longitudinal edges of said first and second manifold portions have substantially identical configurations for joining said first manifold portion and said second manifold portion, said joined edges forming a seam; and at least one mounting flange secured to said joined manifold portions for mounting said manifold in communication with the engine exhaust ports.

10. The exhaust manifold as defined in claim 9 wherein said first and second manifold portions are stamped to include a plurality of arms and a body section.

11. The exhaust manifold as defined in claim 10 wherein said joined longitudinal edges of said first and second manifold portions form an overlapping seam, said seam welded to seal said fluid passageway and fixedly join said first and second manifold portions.

12. The exhaust manifold as defined in claim 11 wherein said at least one mounting flange is secured to an end of said manifold arms for mounting said manifold to the engine.

* * * * *